United States Patent [19]

DeJager

[11] Patent Number: 4,475,712
[45] Date of Patent: Oct. 9, 1984

[54] FLUID VALVE AND METHOD OF MAKING SAME

[75] Inventor: Everett J. DeJager, Cincinnati, Ohio

[73] Assignee: Xomox Corporation, Cincinnati, Ohio

[21] Appl. No.: 337,650

[22] Filed: Jan. 7, 1982

[51] Int. Cl.³ .............................................. F16K 31/44
[52] U.S. Cl. ...................................... 251/214; 251/86; 251/164; 251/309; 277/26; 277/124
[58] Field of Search ...................... 277/59, 124, 22, 26; 251/214, 164, 86, 309; 137/468

[56] References Cited

U.S. PATENT DOCUMENTS

| | | | |
|---|---|---|---|
| 3,101,191 | 8/1963 | Wolfensperger | 251/309 |
| 3,306,620 | 2/1967 | Taschenberg | 277/26 |
| 3,588,125 | 6/1971 | Mastromatteo | 277/26 |
| 4,174,090 | 11/1979 | Nelimarkka | 251/86 |
| 4,177,998 | 12/1979 | Laitkep | 277/59 |

FOREIGN PATENT DOCUMENTS

| | | |
|---|---|---|
| 483577 | 7/1958 | France . |
| 529035 | 5/1939 | United Kingdom . |
| 1001698 | 11/1963 | United Kingdom . |
| 2074294 | 4/1981 | United Kingdom . |
| 2062185 | 5/1981 | United Kingdom ................ 251/214 |

OTHER PUBLICATIONS

European Search Report Application No. EP 83630003, Place of Search The Hague Date of Completion 12-04-1983, Examiner: Van Reeth A. L. J.

Primary Examiner—A. Michael Chambers
Attorney, Agent, or Firm—Kinney and Schenk

[57] ABSTRACT

An improved fluid valve and method of making same are provided wherein the valve has a rotatable closure member which is operated by a rotatable actuating device and which extends transverse the fluid flow axis of the valve, and, the actuating device has unique seal means which enables the valve to be operated while conveying high pressure fluid therethrough and at valve temperatures ranging between −40° F. and 400° F. The actuating device of such valve may also comprise universal means enabling rotation of such actuating device and closure member free of any binding tendencies.

21 Claims, 11 Drawing Figures

FLUID VALVE AND METHOD OF MAKING SAME

BACKGROUND OF THE INVENTION

1. Field of the Invention

This invention relates to a fluid valve of the type employed in controlling fluid flow and to a method of making such valve.

2. Prior Art Statement

It is known in the art to provide a fluid flow control valve, such as shut-off valve, which employs a rotatable closure member of the so-called plug type; and, it is known to operate such rotatable closure member with a rotatable actuating device which is disposed transverse or substantially perpendicular to the flow axis of the valve in which the closure member is utilized.

It is also known in the art to provide a so-called universal joint which allows limited movements of opposite end portions thereof in a substantially infinite number of opposed directions substantially perpendicular to the longitudinal axis of such universal joint.

SUMMARY OF THE INVENTION

Many previous plug-type valves are generally deficient because they tend to leak past seals associated with rotatable actuating devices for their rotatable closure members after repeated cycling of such closure members. This tendency for leakage normally becomes greater in applications where such valves carry fluids at high pressures generally of the order of 750 pounds per square inch gage (psig). Also, this tendency for leakage becomes greater for so-called severe service valves which may be required to operate through a wide range of temperatures. In addition, this tendency for leakage becomes more aggravated due to wear, in applications where the valves are required to be cycled numerous times during their normal service lives.

This invention provides an improved fluid valve of the character mentioned which overcomes the above-mentioned deficiencies. In particular, the valve of this invention is capable of operating for an extended service life with minimum tendency for leakage while carrying fluids therethrough at pressures as high as 750 psig and at temperature extremes ranging between $-40°$ F. and $400°$ F. The valve of this invention has improved seal means for its rotatable valve closure member actuating device; and, in some applications preferably employs unique universal means for such actuating device. The universal means may also be used alone without the seal means in some applications and such universal means unables rotation of the actuating device and closure member free of any binding tendencies during rotation.

In accordance with this invention an improved fluid valve is provided which comprises a valve body having a main portion and a transverse portion adjoining the main portion, a flow passage in the main portion for receiving fluid flow through the valve body, a closure member rotatably supported in the main portion for controlling fluid flow through the flow passage, surface means defining opening means through the transverse portion with the opening means having a central axis, an actuating device for rotating the closure member with the actuating device extending through the opening means and being rotatably supported by the transverse portion, and seal means disposed in the opening means and providing a fluid-tight seal between the transverse portion and the actuating device.

In accordance with one embodiment of the above-described improved valve of this invention the above-mentioned surface means comprises a first cylindrical surface of a given cross-sectional area and a second cylindrical surface of a larger cross-sectional area with the cylindrical surfaces being disposed with associated ends immediately adjacent each other to define a shoulder therebetween, an annular recess is provided in the transverse portion extending inwardly of the shoulder and axially along the said central axis to define a projection and a sealing surface in the transverse portion wherein the sealing surface faces away from the central axis, and the specified seal means comprises an annular seal having a first part disposed within the recess and a second part disposed between the actuating device and the second cylindrical surface with the annular seal providing an improved seal between the transverse portion and the actuating device by contracting against the sealing surface and the actuating device upon subjecting the valve to a reduced temperature.

In accordance with another embodiment of this invention, a valve of the character mentioned is provided which employs an actuating device which comprises universal means enabling rotation of such actuating device and a valve closure member rotated using such device free of any binding tendencies.

In accordance with another embodiment of this invention a valve of the character mentioned is provided which employs an actuating device which comprises universal means of the character mentioned in addition to unique seal means between the transverse portion of the valve and the actuating device.

Accordingly, it is an object of this invention to provide an improved valve of the character mentioned.

Another object of this invention is to provide an improved method of making a valve of the character mentioned.

Other features, objects, uses, and advantages of this invention are apparent from a reading of this description which proceeds with reference to the accompanying drawings forming a part thereof.

BRIEF DESCRIPTION OF THE DRAWINGS

The accompanying drawings show present preferred embodiments of this invention, in which.

DETAILED DESCRIPTION

Figure 1:
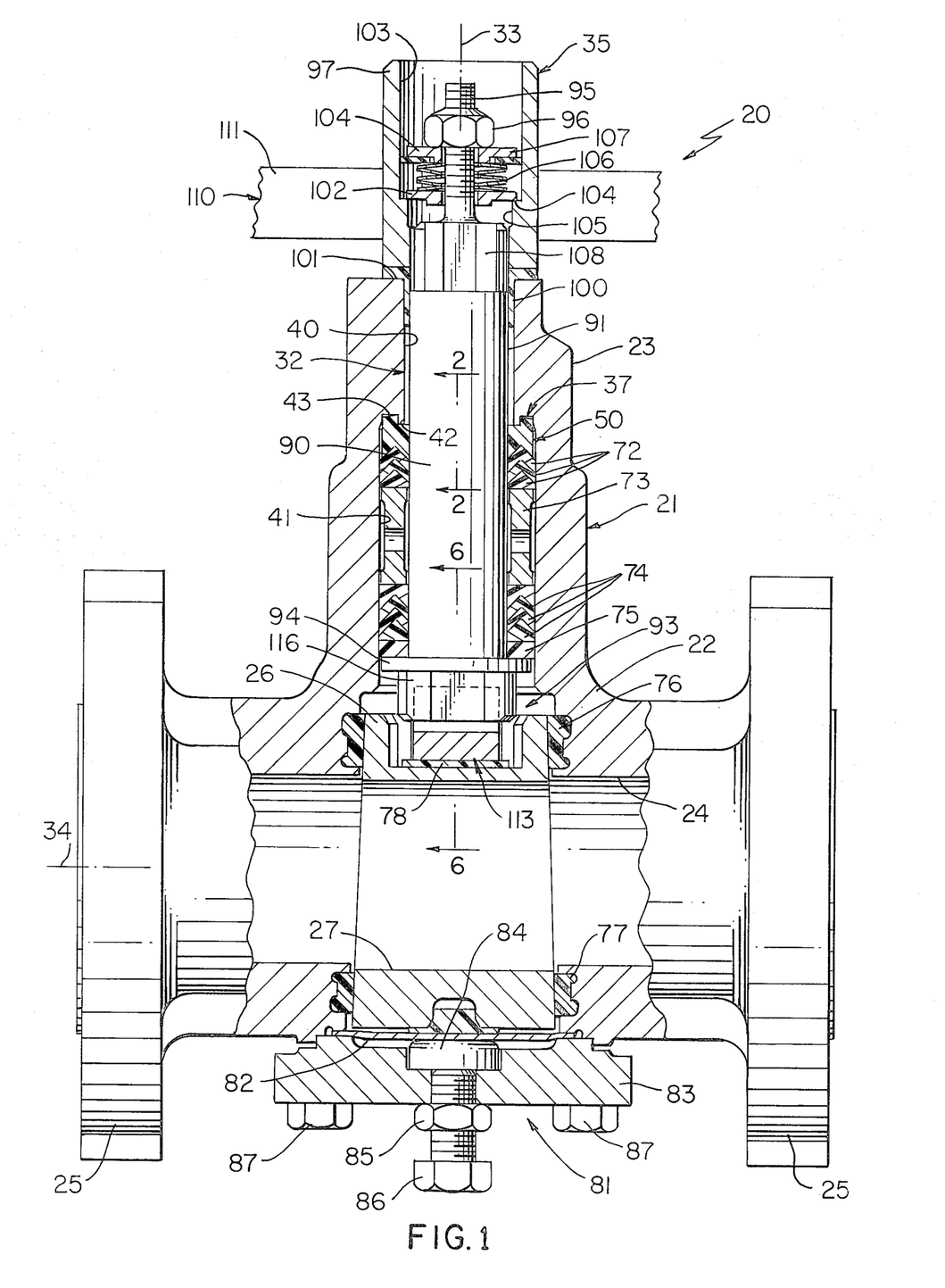
FIG. 1 is a view with parts in elevation, parts in cross section, and parts broken away illustrating one exemplary embodiment of the valve of this invention.

Reference is now made to FIG. 1 of the drawings which illustrates one exemplary embodiment of a fluid flow control valve of this invention which may be in the form of a shut-off valve and is designated generally by the reference numeral 20. The valve 20 comprises a valve body 21 having a main portion 22 and a transverse portion 23 adjoining the main portion and in this example of the invention the main portion 22 and transverse portion 23 are defined as a single piece construction. The valve body 21 with its integral main body portion 22 and transverse portion 23 are preferably made of a suitable high temperature material such as a metal capable of withstanding temperatures ranging from −40° F. to 400° F.

The valve 20 has a flow passage 24 in its main portion 22 for receiving fluid flow through the valve body 21; and, the main portion 22 also has a pair of mounting flanges each designated by the same reference numeral 25. The flanges 25 are preferably defined as an integral part of the valve body at opposite ends thereof; and, such mounting flange 25 may be provided with suitable mounting means (not shown) for mounting the valve 20 in an associated conduit system, as is known in the art.

Figure 8:
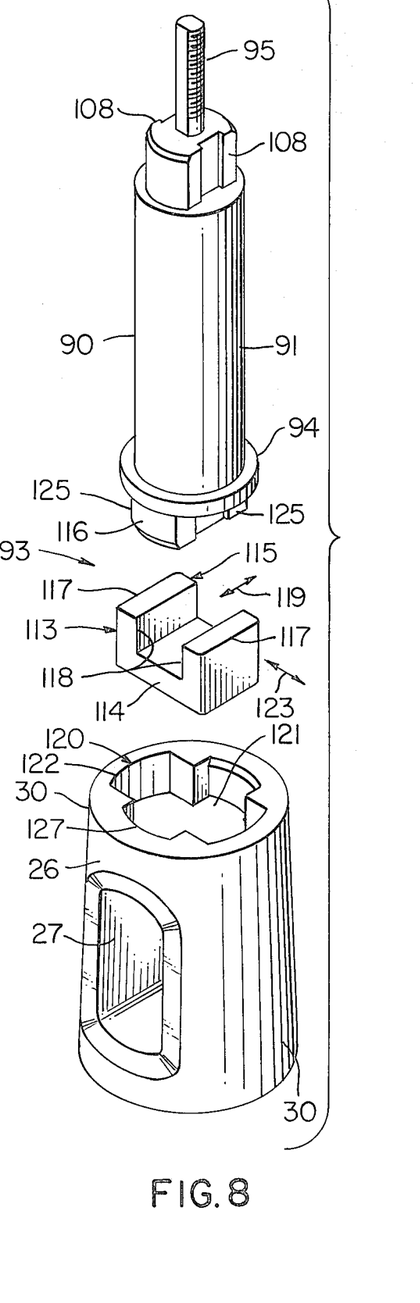
FIG. 8 is an exploded isometric view illustrating the main components of the actuating device, with its universal means, of the valve of FIG. 1.

The valve 20 also has a closure member 26, which is also shown in isometric view in FIG. 8, and the closure member is commonly referred to as a plug member whereby the valve 20 is often popularly referred to as a plug valve. The closure member 26 has an opening 27 therethrough which is particularly adapted to be aligned with the flow passage 24; and, the closure member 26 has opposed surfaces 30 defined at diametrically opposed positions disposed about an axis which is perpendicular to the axis of the opening 27 whereby upon rotating the closure member 26 ninety degrees in either direction the valve is moved from its full open to its full closed position, and as is known in the art.

The valve 20 has a surface means defining opening means, which will be designated generally by the reference numeral 32, through the transverse portion 23 of such valve. The opening means 32 has a central axis 33 which also defines the central axis of the transverse portion. The central axis 33 is disposed transverse, and in this example of the invention is disposed perpendicular, to the longitudinal axis of the main portion of the valve body 20 which is also the central longitudinal axis of the flow passage 24 and is designated by the reference numeral 34.

The valve 20 has an actuating device which is designated generally by the reference numeral 35 for rotating the closure member 26 and such actuating device 35 extends through the opening means 32 and is rotatably supported by the transverse portion 23 of the valve body 21. The valve 20 also has seal means 37 disposed in the opening means 32 and providing a fluid tight seal between the transverse portion 23 and the actuating device 35.

Figure 2:
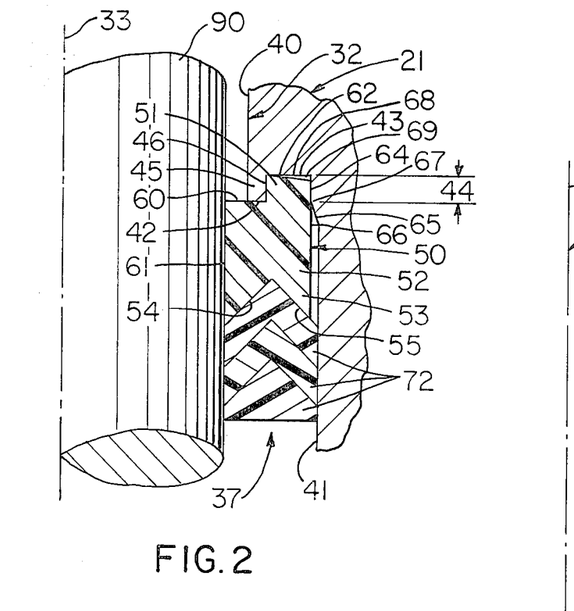
FIG. 2 is a greatly enlarged fragmentary cross-sectional view taken essentially on the line 2—2 of FIG. 1, and showing a unique seal construction comprising the valve of this invention prior to subjecting the valve to a reduced temperature.

As previously mentioned, the valve 20 has surface means defining opening means 32 and the surface means comprises a first cylindrical surface 40 of a given cross-sectional area and a second cylindrical surface 41 of a larger cross-sectional area with the surfaces 40 and 41 being disposed with associated ends immediately adjacent each other to define a shoulder 42 therebetween and as shown in FIGS. 1 and 2.

Figure 3:
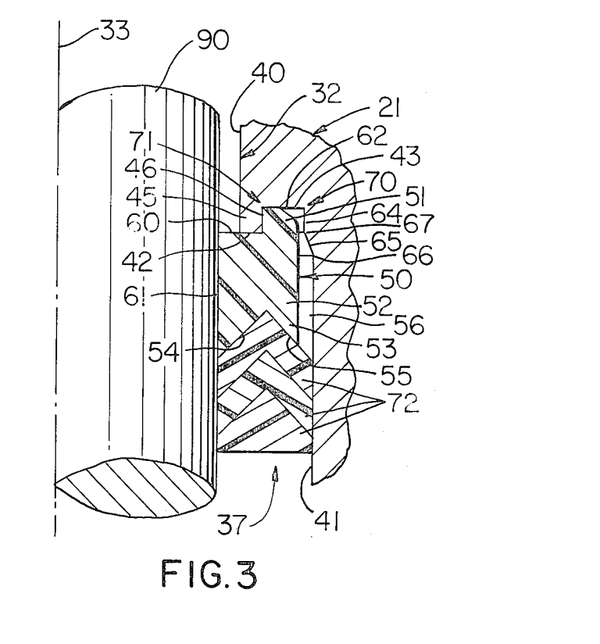
FIG. 3 is a view similar to FIG. 2 illustrating such unique seal construction after subjecting the valve to the reduced temperature.

As best seen in FIGS. 2 and 3, an annular recess 43 is provided in the transverse portion and such recess extends inwardly of the shoulder 42 and axially along the central axis 33 by an axial distance 44 to define a projection 45 and an annular (right circular cylindrical) sealing surface 46 in the transverse portion 23 wherein the sealing surface 46 faces away from the central axis 33. The seal means 37 comprising the valve 20 comprises an annular seal 50 of unique construction and as will now be described in detail.

The annular seal 50 comprises a first part 51 of roughly rectangular cross section disposed within the annular recess 43 and a second part 52 disposed between the actuating device 35, to be subsequently described, and the second cylindrical surface 41. The second part 52 of the annular seal 50 has a lower portion 53 provided with a pair of downwardly facing surfaces 54 and 55 arranged in a roughly V-shaped pattern and such surfaces are particularly adapted to engage a subjacent component of the seal means 37 to be subsequently described.

The annular seal 50 provides an improved seal between the transverse portion 23 of the valve body 21 and the actuating device 35 by contracting against the sealing surface 46 and a portion of the actuating device 35 upon subjecting the valve 20 to a reduced temperature. This reduced temperature may be provided by reduced ambient temperature of the valve or may be provided by flowing fluid through the valve which is at a temperature substantially less than ambient whereby such fluid flowing through the valve 20 cools the overall valve by heat transfer from the fluid to the valve components.

The properties of the unique annular seal 50 will be described in detail subsequently; however, it will be appreciated that in this example of the invention the valve body 21 including the main body portion 22 and transverse portion 23 are made of the same metallic material. Similarly, all components of the actuating device 35 are also made of this same metallic material whereby these components and valve body tend to expand and contract at the same rate inasmuch as they have the same coefficient of thermal expansion.

The annular seal 50 has a coefficient of thermal expansion which is substantially greater than the coefficient of thermal expansion of the valve body 21 and actuating device 35. Under normal operating conditions the normal tendency is for the annular seal 50 to be disposed in position essentially as shown in FIG. 2 of the drawing. However, upon subjecting the valve 20 to reduced ambient temperatures of the character mentioned above the normal tendency is for the outside surface of the annular seal 50 to pull away from the cylindrical surface 41 and provide a gap 56 therebetween, as shown in an exaggerated manner in FIG. 3.

Ordinarily, if the sealing surface 46 and the first part 51 of the annular seal 50 were not to be provided, leakage would occur vertically along the gap 56 and across the top portion 60 of the seal 50. However, due to the provision of the sealing surface 46 as an integral part of the transverse portion 23 and because the annular seal 50 is made of a material having a greater coefficient of thermal expansion than the valve body 21 and the actuating device 35 a tight fluid seal is provided between the annular seal 50 and the transverse portion 23 whereby a location that would otherwise be a leakage path is changed to a fluid tight seal through the unique construction and arrangement of components. During the contraction of the annular seal 50 and inside surface 61 thereof is also urged tightly against the outside surface of an adjoining portion of the actuating device 35 whereby a tight seal is also provided between the seal 50 and such portion of the actuating device.

The first cylindrical surface 40 is a first right circular cylindrical surface 40 having a first diameter and the second cylindrical surface 41 is a second right circular cylindrical surface having a second diameter which is larger than the first diameter. It will also be seen that the annular recess 43 defines a second annular planar sealing surface 62 which adjoins the inner edge of the first-named sealing surface 46 and also defines a third right circular cylindrical surface 64 which adjoins the larger diameter edge of the annular planar surface 62. The third cylindrical surface 64 has a diameter of a size between the first 40 and second 41 cylindrical surfaces previously described. The third cylindrical surface 64 in this example of the invention has a length along the axis 33 which is equal to the axial length 44 of the sealing surface 46; and, a frustoconical surface 65 is disposed between associated adjacent edges of the surface 40 and 41. In particular, the frustoconical surface 65 extends between an edge 66 of the second cylindrical surface 41 and an edge 67 of the third cylindrical surface 64.

As mentioned earlier, the annular seal 50 is made with the first part 51 thereof of substantially rectangular cross-sectional configuration. However, the part 51 preferably has an angled or downwardly tapered top surface 68, as shown in FIG. 2, leaving a wedge-like space 69 when viewed in cross section at one side thereof between surface 68 and surface 62. The angled or tapered top surface 68 facilitates installation of the annular seal 50 and in particular the first part 51 thereof within the recess 43. Further, upon subjecting the valve 20 to a reduced overall temperature the first part 51 becomes compressed in such a manner that it is urged against the sealing surface 46 and simultaneously urged against the annular planar surface 62 to provide an improved seal in the corner area of the first part 51 as shown at 70 in FIG. 3 in a manner heretofore unknown. This improved seal in the corner area at 70 is due in part to more contact force between the top surface of portion 51 and surface 62 as shown at 71.

In addition to the unique annular seal or seal ring 50 described above, the seal means 37 of the valve 20 also comprises (FIG. 1) polymeric packing rings including a pair of so-called chevron packing rings immediately beneath the seal 50 followed by a ring of roughly triangular cross section therebeneath and each of these rings is designated by the same reference numeral 72. The rings 72 are adjoined by a lantern ring 73 of known construction followed by additional polymeric packing rings each designated by the same reference numeral 74 and the rings 74 are followed by a bottom thrust ring 75.

The valve 20 also has sleeve portions 76 and 77 adjoining the top and bottom portions respectively of the closure member 26 and the valve body 21; and, such portions 76 and 77 serve as the primary seal components which prevent fluid leakage out of the main portion 22 of the valve body 21. A polymeric compensator bearing member 78 is also provided between the lower portion of the actuating device 35 and the closure member 26.

The lower portion of the valve 20 also comprises a cover assembly 81 and such cover assembly 81 is comprised of a metal diaphragm 82, a cover 83, a bottom adjustment button 84, a jam nut 85, and a bottom adjustment bolt 86. The cover 83 of the cover assembly 81 is fastened in position by a plurality of cover bolts 87. The function of the cover assembly 81 in plug valve 20 is well known in the art and will not be described in detail.

Figure 6:
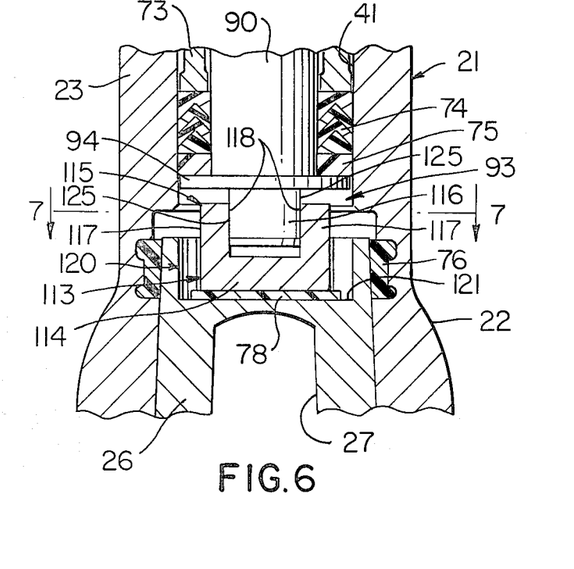
FIG. 6 is a fragmentary cross-sectional view taken essentially on the line 6—6 of FIG. 1.
Figure 7:
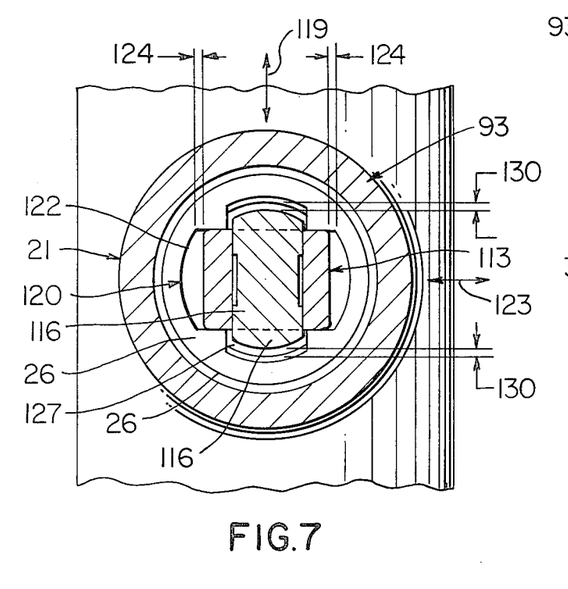
FIG. 7 is a view taken essentially on the line 7—7 of FIG. 6.

As previously mentioned the valve 20 comprises an actuating device 35 and such actuating device is of unique construction. The actuating device 35 comprises an actuating stem 90 defining the main portion of the actuating device and such stem has a right circular cylindrical outside surface portion 91 defining the main part of its axial length. The surface portion 91 is particularly adapted to be engaged by the various seal rings previously described including the annular seal 50. The actuating device also comprises universal means 93 which is illustrated in FIGS. 6-8 of the drawings.

The universal means 93 is particularly adapted to enable rotation of the actuating device 35 and closure member 26 free of any binding tendencies. In particular, it will be appreciated that with the valve 20 having closure plug member 26 in the form of a metal plug as previously described and with such plug 26 being actuated by the actuating device 35 which includes the actuating stem 90 which extends through the major portion of the transverse portion 23 it is very easy for the closure member 26 to tend to bind during rotation thereof.

The universal means or coupling 93 allows stem 90 to rotate plug or member 26 without binding. Because such plug is held within the body by seal portions 76-77 which allow rotation but are essentially rigid in lateral movement and the stem is held within the body by packing which allows rotation but is essentially rigid in lateral movement; and, because of the extreme difficulty of making these parts perfectly concentric, a means is necessary to allow for misalignment. The coupling or universal means 93 allows for such misalignment, lateral or angular, at the point of connection of plug and stem. However, with the provision of the universal means 93, binding tendencies of the valve 20 are substantially eliminated.

The universal means 93 may be used along in a valve such as the valve 20 and hence independent of the improved seal means 37 of this invention and in particular the annular seal 50 and its associated structure to thereby provide an improved valve. However, it has been found that a valve capable of operating at temperatures ranging between −40° F. to 300° F. and carrying fluids at pressures generally of the order of 750 psig and as high as 1,000 psig operated substantially without leakage when both the annular seal 50 and universal means 93 were provided.

The stem 90 of the actuating device 35 has an integral collar 94 extending radially outwardly from the right circular cylindrical surface 91; and, such collar 94 is particularly adapted to fit within the second right circular cylindrical surface 41 for free axial movements during assembly of the valve actuating device 35 and for free rotary movements during rotation of device 35 to open and close the closure member 26. The stem 90 of the actuating device also has a reduced diameter top threaded portion 95 which is particularly adapted to have a threaded lock nut 96 threaded therearound.

The valve actuating device 35 also comprises a valve hub 97 which is disposed outwardly of the transverse portion 23 and the valve hub 97 has a thrust bearing 100 disposed between it and an outer annular surface 101 of the transverse portion 23.

In assembling the actuating device 35 in the valve 20, the stem 90 is inserted through the opening means 32 after placing the components 50 and 72 through 75 in position. The upper portion of the stem 90 is extended through the valve hub 97 (which is disposed in position outwardly of its thrust bearing 100) and an adjustment spring washer 102 is disposed within a counter bore 103 in the hub so that it rests on a shoulder 104 disposed between counterbore 103 and a bore 105 in the lower portion of the hub 97. A plurality of compression springs 106 are placed in position followed by another adjustment spring washer 107 whereupon the threaded lock nut 96 is threaded in position, in essence, urging the various components defining the seal means 37 axially due to the action of the collar 94 and lock nut 96 to thereby compress such seal means 37 (with seal 50) axially. The springs 106 serve as axial means for yieldingly compressing and holding the various seals of the seal means 37 in an axially compressed yet yieldable resilient relation. It should be noted that a thrust bearing 100 serves as an axial thrust bearing while allowing unobstructed rotation of the valve hub 97 and the entire actuating device rotary coupled thereto.

To provide the above-mentioned rotary coupling between the valve hub 97 and the stem 90, the upper portion of the stem 90 has flat surfaces or flats 108 at diametrically opposed positions thereon which are adapted to be engaged by cooperating flat surfaces at corresponding diametrically opposite positions of the valve hub 97 so that upon rotating the valve hub the entire actuating device 35 is rotated to thereby rotate the closure member or plug 26.

A suitable manual wrench 110 is preferably provided for rotating the valve hub and hence the actuating device. The wrench 110 comprises a portion 111 which is suitably connected or intermeshed with the hub 97 to provide rotation thereof and of the actuating device 35 and hence closure member 26. It will also be appreciated that the hub 97 and actuating device may be rotated by mechanical means (not shown), if desired.

Figure 4:
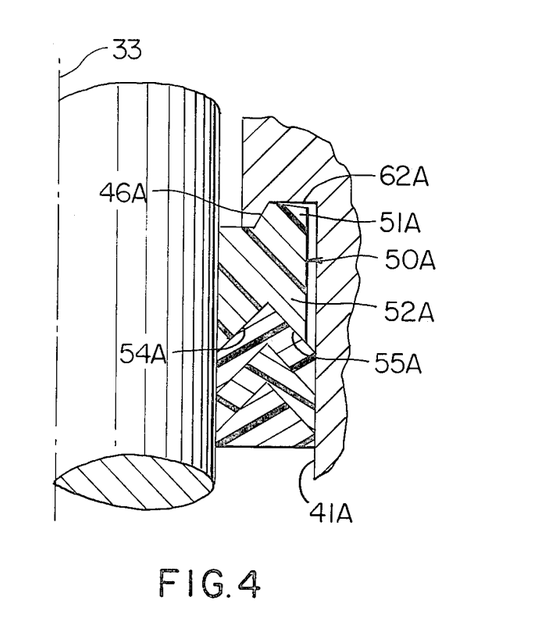
FIG. 4 is a view similar to FIG. 2 illustrating a modification of the seal construction.
Figure 5:
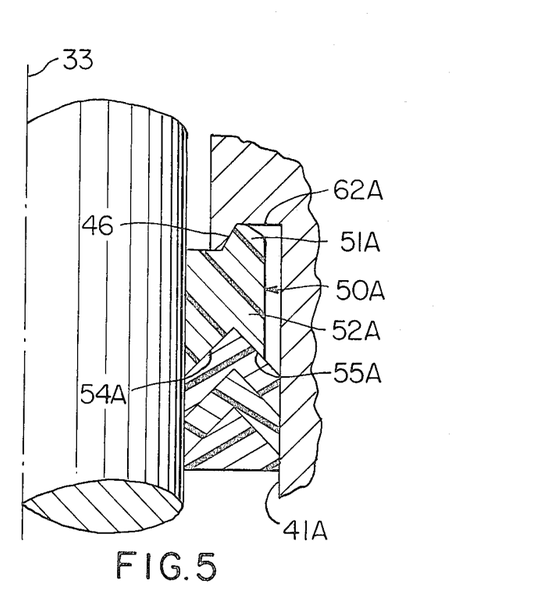
FIG. 5 is a view similar to FIG. 3 illustrating the seal construction of FIG. 4 after subjecting the valve to the reduced temperature.

As described earlier, the valve 20 has a unique seal 50 therein. A modification of the seal 50 and associated structure is illustrated in FIGS. 4 and 5 of the drawings and will now be described in connection with such FIGS. The seal of FIGS. 4 and 5 is very similar to the previously described seal and will be designated by the reference numeral 50A. Also, portions of the seal of FIGS. 4 and 5 and associated components which are similar to corresponding portions and components presented in FIGS. 2 and 3 will be designated by the same reference numerals as in FIGS. 2 and 3 followed by the letter designation "A" and not described again in detail.

The main differences between the seal 50A and associated components illustrated in FIGS. 4 and 5 and the seal 50 and associated components illustrated in FIGS. 2 and 3 is that the sealing surface 46A instead of being right circular cylindrical and thus substantially parallel to the central axis 33 is disposed at an angle thereto, whereby surface 46A is a frustoconical sealing surface. In this example such angle is roughly 30 degrees with the axis 33; however, it may be at any angle and indeed such angle may be at the same angle with axis 33 as surface 54A (of surfaces 54A-55A in second part 52A) is with such axis 33.

It will also be seen that the second right circular cylindrical surface 41A extends to the large diameter portion of the annular planar surface 62A whereby a frustoconical surface similar to the frustoconical surface 65 of FIGS. 2 and 3 is not provided in the transverse portion of the valve body of FIGS. 4 and 5.

Except for the above differences the other components are substantially identical and during subjecting of the valve having the modified seal structure shown in FIGS. 4 and 5 to reduced ambient temperatures it will be appreciated that an improved seal is provided by the part 51A thereof by being urged against the inclined sealing surface 46A as well as against the annular planar surface 62A in a similar manner, as shown in FIG. 5; and, in a similar manner as described previously in connection with FIG. 3. Accordingly, such previous description will not be repeated.

Having described the unique annular seal of this invention, including a modification thereof, reference is now made to FIGS. 6 through 8 of the drawings which illustrate one exemplary embodiment of the actuating device 35 in more detail. In particular, it will be seen that the actuating device 35 has the universal menas 93 as previously mentioned and such universal means 93 comprises the lower portion of the actuating device 35.

The universal means 93 of FIGS. 6-8 comprises a U-shaped coupling component 113; and, the coupling component 113 has a lower part 114 which is operatively associated with the closure member 26 and an upper part 115 which is operatively associated with the actuating stem 90. To enable operative association of the stem, such stem 90 has a lower downwardly extending part 116, of roughly rectangular cross-sectional outline, disposed beneath the collar 94 which is particularly adapted to be disposed between parallel arms 117 defining the upper part 115 of the U-shaped member 113 with the arms 117 having inside surfaces 118. The arms 117 and surfaces 118 are such that the lower part of the stem 90 and particularly part 116 is free to move in opposed directions along a rectilinear path indicated by the double arrow 119 in FIGS. 7-8 with the components of the valve in their assembled relation.

The closure member 26 has what will be referred to as a cross-shaped cutout 120 provided in the upper portion thereof with such cutout having a bottom support surface 121. The cross-shaped cutout 120 is particularly adapted to receive the plug stem compensator bearing 78 therein and such bearing 78 is supported on the bottom surface 121 whereby bearing 78 supports the member 113. The cutout 120 has a portion 122 which receives the member 113; and, with the U-shaped component 113 disposed within the portion 122 of cutout 120 it is seen that the lower portion of stem 90 and component 113 are free to move in opposed directions along a rectilinear path 123 by limited distances 124 on opposite sides of a central axis, with the component 113 in a central position. It will be noted that the downwardly extending part 116 of stem 90 has opposed surfaces 125 which slideably fit within surfaces 118; however, as part 116 moves along path 123, component 113 also moves therewith, and by limited distances 124. It will be appreciated that this movement is relative to the valve closure member 26.

The universal means 93 also enables movements at 90 degrees to the path 123. In particular, with the U-shaped component 113 disposed in position it will be seen that the lower portion 116 of stem 90 is disposed between the surfaces 118 of the parallel legs 117 defining the upper part of the component 113; and, the surfaces 125 of portion 116 are slideable along surfaces 118. The cross-shaped cutout 120 has a roughly rectangular portion 127 disposed at ninety degrees to portion 122. The portion 127 is dimensioned to allow movement of the portion 116 of stem 90 in opposed directions along rectilinear path 119 (FIG. 7) by distances 130. Again, the movement of the lower portion 116 of stem 90 is relative to the valve closure member 26.

With the above-described capability it will be appreciated that the stem 90 and the closure member 26 are thus provided with limited freedom of movement with respect to each other yet are coupled for rotary movement whereby in essence, the construction described defines the universal means 93. It will be appreciated that the universal means 93 as defined for the valve 20 is such that the stem 90, coupling component 113, and closure member 26 are disposed in intermeshing relation yet are free of fasteners, or the like, therebetween which hold some together against movement away from each other and parallel to the central axis 33.

Figure 9:
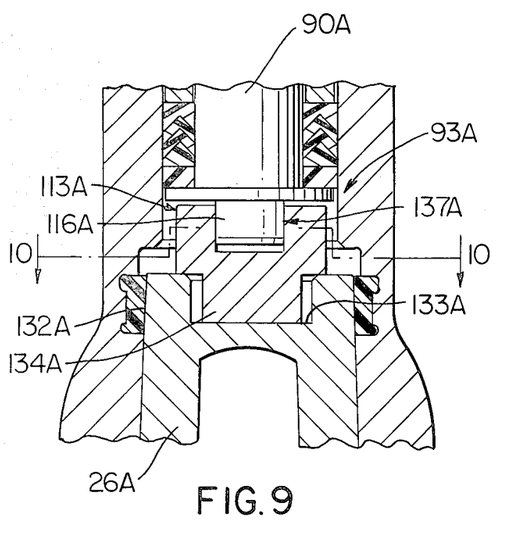
FIG. 9 is a view similar to FIG. 6 illustrating a modification of the actuating device of FIGS. 6-8 which may be used interchangeably therewith.
Figure 10:
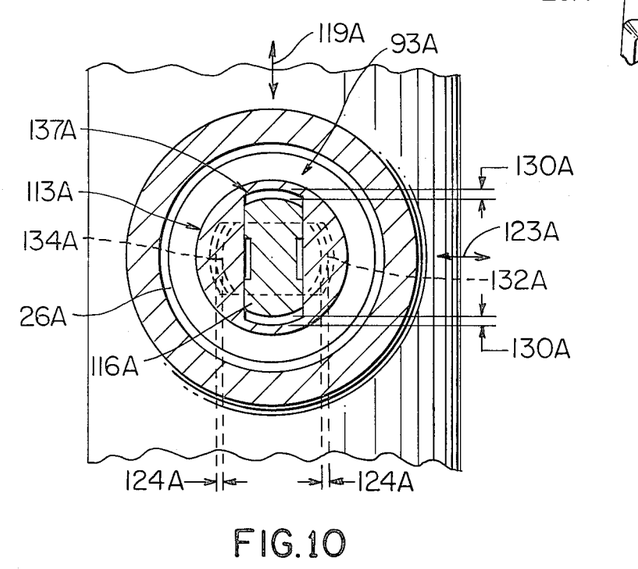
FIG. 10 is a view taken essentially on the line 10—10 of FIG. 9.
Figure 11:
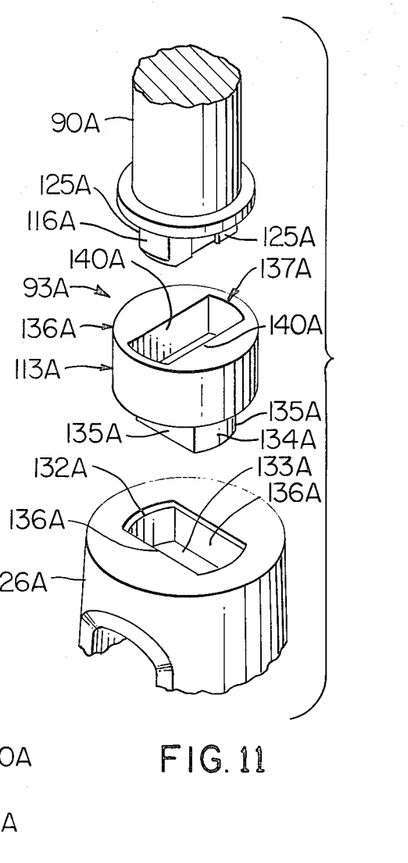
FIG. 11 is an exploded isometric view similar to FIG. 8 of the modified actuating device of FIGS. 9-10 yet only illustrating the upper portion of the modified valve closure member, the lower portion of the actuating stem for such device, and an intermediate coupling component which is operatively associated therebetween.

A modification of the universal means 93 is illustrated in FIGS. 9, 10 and 11 of the drawings. Because of the similarity of the universal means of 9-11 with the universal means 93 the universal means of FIGS. 9-11 will be designated by the reference numeral 93A and components which are similar to corresponding components of the universal means 93 previously described in FIGS. 6, 7 and 8 of the drawings will be designated by the same reference numerals as previously, followed by the letter designation "A" and not described in detail.

In the modified universal means 93A of FIGS. 9 through 11, it will be seen that the stem 90A has a lower portion 116A similar to the portion 116 of stem 90. However, the closure member 26A instead of having a cross-shaped cutout therein has a substantially rectangular cutout 132A provided with a bottom surface 133A.

It will also be seen that the coupling member or component 113A instead of being U-shaped is of a special configuration and has a lower portion 134A of roughly rectangular cross section which is particularly adapted to be received within the rectangular cutout 132A. The lower portion 134A has opposed surfaces 135A which are slideably received between surfaces 136A of the cutout 132A. With the component 113A in position in the valve 20, it will be seen that component 113A and lower portion 116A of stem 90A are free for limited movement in opposed directions along rectilinear path 123A in a similar manner as described for movement 123 previously. It will be noted that the extent of the limited movement is for distances 124A which are similar to distances 124 previously described. This is made possible due to the size relationship of portion 134A relative to cutout 132A.

The member 113A also has an upper portion 136A provided with a cutout 137A of rectangular outline which is particularly adapted to receive the lower portion 116A of the stem 90A therein. The portion 116A has opposed surfaces 125A which are slideably received between opposed surfaces 140A of the cutout 137A. It will also be seen that cutout 137A is longer than the corresponding dimension of portion 116A whereby portion 116A is free to move in opposed directions by distances 130A relative to member 26A in a similar manner as described for distances 130.

Thus, the component 113A cooperates with the lower portion 116A of the stem 90A and with the closure member 26A to provide a universal movement action which is similar to the action previously described for components of the universal means 93, whereby the universal means 93A enables rotation of the stem 90A and closure member 26A without a binding action therebetween.

It will also be seen that in the embodiment of FIGS. 9, 10 and 11 the coupling component 113A, closure member 26A, and stem 90A with its portion 116A are also disposed in intermeshing relation free of fasteners therebetween which hold same together against movements away from each other and parallel to the axis 33 of the valve in which these components are utilized.

In the above description of the universal means 93A of FIGS. 9, 10 and 11, only certain components have been illustrated and described using many of the same reference numerals as used previously in connection with the universal means 93. Further, certain modified components of the universal means have been given new reference numerals also followed by the letter designation "A". However, it is to be understood that the universal means 93A may be used interchangeably with the universal means 93 in the valve 20 illustrated in FIG. 1.

It will also be appreciated that the universal means 93A illustrated in FIGS. 9, 10 and 11 may be utilized in the valve 20 which utilizes the modified seal structure illustrated in FIGS. 4 and 5.

Thus, it is seen that in accordance with the teachings of this invention an improved valve and method of making the same are provided wherein the valve is capable of operating at extreme temperatures ranging between −40° F. and 300° F. Further, the valve is capable of carrying fluids (either liquids or gases or mixtures thereof) at high fluid pressures which may be as high as 1,000 psig. Also, it will be appreciated that the valve of this invention (including all modifications thereof) is capable of providing improved performance after extended service even though there may have been considerable wear during such extended service.

In the valve 20 of this example the projection 45 is defined as an integral part of the transverse portion 23 as a single piece structure and the projection 45 is disposed at a location remote from the closure means or plug 26 so that the annular seal 50 defines the outermost seal of the seal means 37. However, it will be appreciated that the projection 45 may be defined as an integral part of portion 23 after defining and threading, welding, or otherwise attaching same in position in a fluid-tight manner.

The valve 20 including the main 22 and transverse 23 portions of main body 21 as well as the actuating device 35 are preferably made of high temperature metal having roughly the same coefficient of thermal expansion.

In addition, and as mentioned earlier the seal 50 is made of a synthetic plastic material which has a coefficient of thermal expansion which is roughly ten times greater than the coefficient of thermal expansion of the valve 20 and its actuating device 35. Further, the synthetic plastic material is preferably polytetrafluoroethylene (TFE).

The TFE for the seal 50 or 50A may be provided by any commercial source. One source is the E. I. DuPont de Nemours and Co., Inc., 1007 Market Street, Wilmington, Del. and such TFE is sold by DuPont under the trade name TEFLON.

It will also be appreciated that the various sealing rings identified as rings 72 and 74 are also preferably made of TFE together with the sleeves 76–77 and the compensator bearing 78. Further, the bottom seal ring 75 and thrust bearing 100 are preferably made of TFE which has been impregnated with graphite to improve not only the load-carrying capacity thereof but also to provide improved antifriction properties therefor.

Terms such as upper, lower, outermost, downwardly and numerous others have been used throughout this disclosure; however, it is to be understood that all of these terms have been used for ease of description and often are related to the particular orientation of the components in the drawings. Accordingly, such terms are not to be considered as limiting the scope of this invention in any way.

While present exemplary embodiments of this invention, and methods of practicing the same, have been illustrated and described, it will be recognized that this invention may be otherwise variously embodied and practiced within the scope of the following claims.

What is claimed is:

1. In a fluid valve comprising a valve body having a main portion and a transverse portion adjoining said main portion, a flow passage in said main portion for receiving fluid flow through said valve body, a closure member rotatably supported in said main portion for controlling fluid flow through said passage, surface means defining opening means through said transverse portion, said opening means having a central axis, an actuating device for rotating said closure member, said actuating device extending through said opening means and being rotatably supported by said transverse portion, and seal means disposed in said opening means and providing a fluid-tight seal between said transverse portion and said actuating device, the improvement in which, said surface means comprises a first cylindrical surface of a given cross-sectional area and a second cylindrical surface of a larger cross-sectional area, said surfaces being disposed with associated ends immediately adjacent each other to define a shoulder therebetween, an annular recess in said transverse portion extending inwardly of said shoulder and axially along said axis to define a projection and a sealing surface in said transverse portion wherein said sealing surface faces away from said central axis, and said seal means comprises an annular seal having a first part disposed within said recess and a second part disposed between said actuating device and said second cylindrical surface, said annular seal providing an improved seal between said transverse portion and said actuating device by contracting against said sealing surface and said actuating device upon subjecting said valve to a reduced temperature.

2. A valve as set forth in claim 1 in which said actuating device comprises universal means enabling rotation of said actuating device and closure member free of any binding tendencies.

3. A valve as set forth in claim 2 in which said universal means defines the lower portion of said actuating device and comprises a coupling component having a lower part thereof operatively associated with said closure member and an upper part operatively associated with an actuating stem comprising said actuating device.

4. A valve as set forth in claim 3 in which said stem, coupling component, and closure member are disposed in intermeshing relation free of fasteners therebetween which hold same together against movement away from each other and parallel to said axis.

5. A valve as set forth in claim 2 in which said first cylindrical surface is a first right circular cylindrical surface having a first diameter and said second cylindrical surface is a second right circular cylindrical surface having a second diameter which is larger than said first diameter.

6. A valve as set forth in claim 5 in which said annular recess is of roughly rectangular cross-sectional outline and defines an annular planar sealing surface adjoining the inner edge of said first-named sealing surface and extending radially toward said second cylindrical surface.

7. A valve as set forth in claim 1 in which said first cylindrical surface is a first right circular cylindrical surface having a first diameter, said second cylindrical surface is a second right circular cylindrical surface having a second diameter which is larger than said first diameter, and said annular recess is of roughly rectangular cross-sectional outline when viewed on one side of said central axis and defines an annular planar sealing surface adjoining the inner edge of said first-named sealing surface and extending radially toward said second cylindrical surface.

8. A valve as set forth in claim 1 in which said first cylindrical surface is a first right circular cylindrical surface having a first diameter, said second cylindrical surface is a second right circular cylindrical surface having a second diameter which is larger than said first diameter, said recess defines an annular sealing surface adjoining said first-named sealing surface and a third right circular cylindrical surface adjoining the larger diameter edge of said annular sealing surface and having a diameter of a size between said first and second diameter, and a substantially frustoconical surface disposed between associated edges of said second and third cylindrical surfaces.

9. A valve as set forth in claim 7 in which said third cylindrical surface has a length along said central axis which is roughly equal to the axial length of said first-named sealing surface along said axis.

10. A valve as set forth in claim 9 in which said projection is defined as an integral part of said transverse portion as a single piece structure and is disposed at a location remote from said closure means so that said annular seal defines the outer most seal of said seal means.

11. A valve as set forth in claim 7 in which said main and transverse portions of said main body together with said actuating device are made of a high temperature metal having roughly the same coefficient of thermal expansion.

12. A valve as set forth in claim 11 in which said seal is made of a synthetic plastic material which has a coefficient of thermal expansion which is greater than said same coefficient of thermal expansion.

13. A valve as set forth in claim 12 in which said synthetic plastic material is polytetrafluoroethylene (TFE).

14. A valve as set forth in claim 13 in which, said projection is defined as an integral part of said transverse portion and is disposed at a location remote from said closure member so that said annular seal defines the outermost seal of said seal means, said sealing surface is a right circular cylindrical surface disposed concentrically around said central axis and has its axis coinciding therewith, and upon subjecting said valve to said reduced temperature said first part of said annular seal is urged against both said sealing surface and said annular planar sealing surface.

15. A valve as set forth in claim 14 in which said first part of said annular seal has a downwardly tapered top surface which with said annular seal in position leaves a wedge-like space when viewed in cross section at one side thereof between said annular planar sealing surface and said tapered top surface, said tapered top surface serving to facilitate installation of said annular seal and in particular said first part thereof within said recess, and upon subjecting said valve to said reduced temperature said first part becomes compressed in such a manner that it is urged against said sealing surface and simultaneously urged against said annular planar sealing surface to provide an improved seal in the corner area of said first part, said improved seal in said corner area being due in part to more contact force between the top surface of said first part and said annular planar sealing surface.

16. A valve as set forth in claim 13 in which, said projection is defined as an integral part of said transverse portion and is disposed at a location remote from said closure member so that said annular seal defines the outermost seal of said seal means, said sealing surface is a frustoconical surface disposed concentrically around said central axis and has its axis coinciding therewith, and upon subjecting said valve to said reduced temperature said first part of said annular seal is urged against both said sealing surface and said annular planar sealing surface.

17. A valve as set forth in claim 16 in which said first part of said annular seal has a downwardly tapered top surface which with said annular seal in position leaves a wedge-like space when viewed in cross section at one side thereof between said annular planar sealing surface and said tapered top surface, said tapered top surface serving to facilitate installation of said annular seal and in particular said first part thereof within said recess, and upon subjecting said valve to said reduced temperature said first part becomes compressed in such a manner that it is urged against said sealing surface and simultaneously urged against said annular planar sealing surface to provide an improved seal in the corner area of said first part, said improved seal in said corner area being due in part to more contact between the top surface of said first part and said annular planar sealing surface.

18. In a fluid valve comprising a valve body having a main portion and a transverse portion adjoining said main portion; a flow passage in said main portion for receiving fluid flow through said valve body; a closure member rotatably supported in said main portion for controlling fluid flow through said passage; surface means defining opening means through said transverse portion; said opening means having a central axis; an actuating device for rotating said closure member; said actuating device extending through said opening means and being rotatably supported by said transverse portion; said actuating device having an actuating stem; seal means disposed in said opening means and providing a fluid-tight seal between said transverse portion and said actuating device; said actuating device comprising universal means enabling rotation of said actuating device and closure member free of any binding tendencies; said universal means defining the lower portion of said actuating device and comprising; a coupling component disposed axially along said central axis between said actuating stem and said closure member; said coupling component having a lower part thereof operatively associated with said closure member and an upper part operatively associated with said actuating stem; said coupling component being a U-shaped component which has said lower part defining its lower part and a pair of parallel arms extending upwardly from said lower part and defining said upper part; said stem having a downwardly extending portion of roughly rectangular cross-sectional outline which is disposed between said parallel arms; and said arms and downwardly extending stem portion being dimensioned to allow movement of said stem portion between and relative to said arms along a first rectilinear path; the improvement in which said closure member has a cross-shaped cutout in the upper portion thereof; said cutout being adapted to receive said lower part of said U-shaped component therewithin; said cutout having a first cutout portion dimensioned to allow movement within said first cutout portion of said U-shaped component and said downwardly extending portion of said stem which is disposed between said arms along a second rectilinear path aligned substantially perpendicular to said first path; said cutout having a second cutout portion dimensioned to allow movement within said second cutout portion of said stem portion along said first path; and said stem, coupling component, and closure member thus being provided with limited freedom of movement relative to each other along said first and second paths free of said binding tendencies yet are coupled for rotary movement to define said universal means.

19. A valve as set forth in claim 18 and further comprising a polymeric compensator bearing member disposed between said lower part of said U-shaped component and said closure member, said bearing member serving to support said U-shaped component on said closure member.

20. In a fluid valve comprising a valve body having a main portion and a transverse portion adjoining said main portion; a flow passage in said main portion for receiving fluid flow though said valve body; a closure member rotatably supported in said main portion for controlling fluid flow through said passage; surface means defining opening means through said transverse portion; said opening means having a central axis; an actuating device for rotating said closure member; said actuating device extending through said opening means and being rotatably supported by said transverse portion; said actuating device having an actuating stem; seal means disposed in said opening means and providing a fluid-tight seal between said transverse portion and said actuating device; said actuating device comprising universal means enabling rotation of said actuating device and closure member free of any binding tendencies; said universal means defining the lower portion of said actuating device and comprising; a coupling component disposed axially along said central axis between said actuating stem and said closure member; and said coupling component having a lower part thereof operatively associated with said closure member and an upper part operatively associated with said actuating stem; the improvement in which, said stem has a downwardly extending stem portion of roughly rectangular cross-sectional outline, said closure member has a roughly rectangular closure cutout in its upper portion, said coupling component has an upper portion provided with a roughly rectangular coupling cutout which has said stem portion disposed therein, and said coupling component has a downwardly extending coupling portion also of roughly rectangular cross-sectional outline which is disposed in said closure cutout.

21. A valve as set forth in claim 20 in which said coupling cutout is dimensioned to allow movement therewithin of said stem portion along a first rectilinear path; said closure cutout is dimensioned to allow movement therewithin of said coupling portion along a second rectilinear path which is substantially perpendicular to said first path; and said stem, coupling component, and closure member thus being provided with limited freedom of movement relative to each other along said first and second paths free of said binding tendencies yet are coupled for rotary movement to define said universal means.

* * * * *